Figure 1:
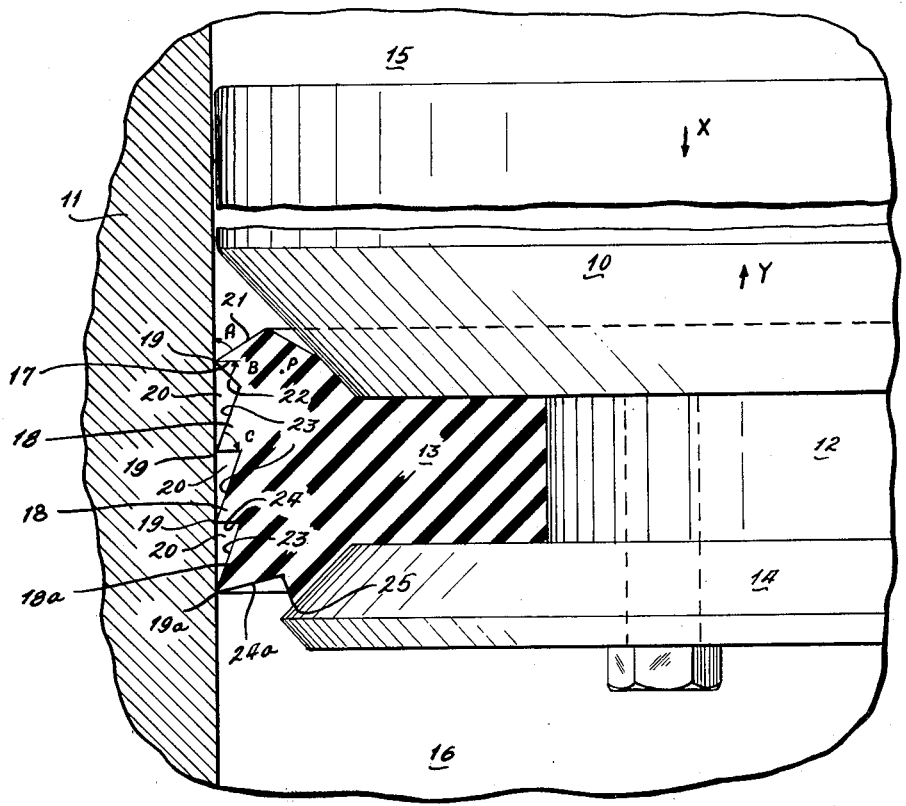

Aug. 11, 1964  C. E. WRIGHT  3,144,256
FREE PISTON SEAL
Filed Aug. 6, 1962

INVENTOR:
C. E. WRIGHT
BY
Gravely, Lieder & Woodruff
ATTORNEYS.

United States Patent Office 3,144,256
Patented Aug. 11, 1964

3,144,256
FREE PISTON SEAL
Clarence E. Wright, St. Louis County, Mo.
(1326 Breezeridge, St. Louis 31, Mo.)
Filed Aug. 6, 1962, Ser. No. 215,177
5 Claims. (Cl. 277—208)

The present invention relates to seals, and specifically relates to a multi-lip seal for a free separator piston. In particular, the present invention is adapted for use with the separator piston shown in Smith Patent No. 2,917,003.

One of the major problems with present piston seals is that under high operating pressures, the seal tends to develop considerable static friction at the point of engagement with the inner wall of the cylinder. These seals have a large outer peripheral surface which is in solid-to-solid contact with the cylinder wall. Thus, when abrasive fluids, such as oil well drilling muds, are pumped under high pressures, 1000 p.s.i. and above, the seals are forced outwardly into heavy contacting engagement with the cylinder wall, and the abrasive fluid, which is used to lubricate the cylinder wall, tears up the seal and the cylinder wall. Present seals used under the foregoing conditions often need replacement and improvement therein is desirable for extended field use.

The present invention provides a seal having a plurality of lips with the outermost edges defining essentially hairline contact with the cylinder wall providing effective fluid rings which seal against the cylinder wall with little static friction being developed by the seal itself. Volumes of lubricating fluid, such as oil, are trapped between the lips and the incompressibility of the fluid keeps the lips from being deformed and pressed into engagement with the cylinder wall, when the seal is under pumping pressure.

There is very little static friction, and also very little dynamic friction from the fluid seal. Thus, there is little heating of the seal and little wear on the seal, since the seal contacts the cylinder wall only in a series of annular knife edges.

The present invention is applicable particularly to a free piston which separates a pumping fluid and a pumped fluid. The seal has a lubricant control lip which is shaped so that it passes pumping fluid, which normally is lubricating oil, to a series of sealing lips which are angled so that the seepage is in the direction of the pumped fluid. This is important, since the pumped fluid may be an abrasive fluid such as oil well drilling mud, and it is essential to keep the abrasive material from mixing with the pumping fluid. The hairline contact of the sealing lips is not worn away by the abrasive material, since any material which passes the outermost lip is trapped in the outermost fluid ring and does not bear on the cylinder wall.

Another advantage of the present construction is that the lubricant control lip on the seal is angled toward the pumped fluid so that, if there is a differential pressure across the piston, that is, if the pumping fluid is at a greater pressure than the pumped fluid, the lubricant control lip will pivot into engagement with the cylinder wall and prevent leakage and escape of the pumping fluid.

One of the principal objects of the present invention therefore is to provide a seal for a free piston having lubricating pumping fluid and pumped fluid on opposed sides thereof. Another object is to provide a seal having a plurality of annular grooves separated by very thin edges around the outer periphery thereof.

A further object of the present invention is to provide a seal for a free piston wherein a minute and regulated amount of oil is passed from one side of the seal and is trapped and compressed in a series of peripheral notches in the seal, the oil itself acting as a seal when the piston is pumping fluid.

Another object of the present invention is to provide a seal for a free separator piston having substantially no pressure differential thereacross and having a lubricating fluid on the backside thereof, said seal having only a series of knife edge solid-to-solid contact lines with the cylinder wall and having lubricating fluid trapped between the knife edge contact lines, said fluid being under the same pressure as the operating pressure of the piston and in sealing engagement with the cylinder wall.

These and other objects and advantages will become apparent hereinafter.

The present invention comprises a seal having a series of annular line contact lips defining annular grooves therebetween, one of said lips being adapted to meter lubricating pumping fluid to the series of annular grooves, and the other lips permitting seepage of the lubricant to a pumped fluid, the fluid in said grooves under operating pressure, acting as a seal to prevent contamination of the pumping fluid by the pumped fluid.

Figure 2:
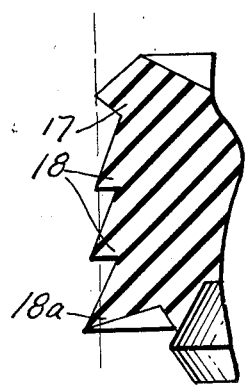

In the drawings wherein like parts refer to like numbers wherever they occur:

FIG. 1 is a fragmentary partially broken view showing a free piston in a cylinder with the present seal shown in section, and FIG. 2 is an enlarged fragmentary view of one edge of the seal means showing in exaggerated fashion the progressively greater diameter of the seal lips.

FIG. 1 shows a separator piston 10 mounted in a cylinder 11, the piston 10 being a free piston (that is, no piston rod or other actuating means is mechanically connected thereto).

The piston 10 includes a reduced portion 12 at one end to which a seal 13 is attached, by a seal retainer 14.

The piston and seal separate a lubricating or pumping fluid 15 and a pumped fluid 16, which usually contains abrasive material.

The seal 13 comprises a lubricant control lip 17 or lips on the lubricating fluid side thereof, and a series of sealing lips 18 on the pumped fluid side thereof. While it is not essential to have a lubricant control lip 17, it is preferable to avoid excessive loss of lubricant.

In the preferred construction, the seal 13 is of Buna-N rubber, but can be of any rubber-like sealing material. Both the lubricant control lip 17 and the seal lips 18 have essentially hairline edges 19 which define minimum areas of annular contact with the cylinder wall 11. The smaller the area of contact, the better wearing and sealing characteristics are exhibited by the seal 13. A series of annular grooves 20 are defined between the lips 19. The annular grooves 20 are filled with lubricating fluid 15 which is pressed, by the rubber or rubber-like nature of the seal 13, when the seal 13 is under operating pressure (which normally is 1000 p.s.i. or greater), into sealing engagement with the cylinder.

Since the oil 15 in the grooves 20 essentially is incompressible and the rubber of the seal 13 responds to pressures almost like a liquid, the piston operating pressure is transmitted to the fluid trapped in the grooves 20 and to the cylinder wall 11.

As the piston 10 is a free piston, the pressure surrounding it and within the seal 13 is essentially equal in all directions, and the fluid trapped in the annular grooves 20 supports the lips 19 to prevent their being forced into additional solid-to-solid contact with the cylinder wall. The substantially hairline solid-to-solid contact between the seal 13 and the cylinder 11 thus is maintained even though the seal 13 may be under extremely high operating pressure.

The seal 13 has an outside diameter of approximately 6 inches with the grooves 20 being about 3/16 inch deep. With a given diameter cylinder 11, the outside diameter of the lips 17 and 18 will be about 0.04–0.01 inch less. The outside diameter of the oil control lip 17 usually is less than the seal lips 18, and the seal lips increase in diameter as they approach the pumped fluid side of the seal 13.

The sealing lip 17 has an outwardly tapered upper surface 21 and a shorter inwardly tapered undersurface 22. The surfaces 21 and 22 intersect in the hairline edge 19 and are angled so as to pass a small quantity of lubricating fluid 15 to the annular spaces 20 between the sealing lips 18 on the intake stroke of the piston 10 if grooves 20 are not completely filled. If the grooves 20 are already filled with lubricating fluid, the resistance to flow of fluid past lip 17 is increased and the flow decreases to a controllable minimum. Thus, the annular grooves 20 are filled with lubricant 15 at all times, since the supply is renewed with each intake stroke of the piston 10, if the grooves are not already filled with lubricating fluid.

In the preferred construction, the lubricant control lip surface 21 defines an angle of about 60° with the vertical (angle "A" of FIG. 1), and the bottom surface 22 defines an angle of about 45° with the horizontal (angle "B" of FIG. 1).

The angle "A," between the top surface 21 and the vertical, controls the amount of oil which is passed by the lip 17 on the intake stroke. As the angle "A" approaches 0°, the amount of oil passed becomes greater, since the wedging action of the oil trapped between the piston 10, the cylinder 11 and the seal top surface 21 becomes greater.

The angle "B" controls the amount of oil passed on the exhaust stroke of the loose fitting piston 10 by the seal 13. As the angle "B" approaches 0°, i.e., as the side 22 becomes more nearly horizontal, less oil is passed behind the seal 13 on the exhaust stroke of the piston 10. It is not desired to return lubricant from the grooves 20 to the lubricant side of the piston 10, since abrasive materials may be carried by the returning lubricant. Therefore, on the exhaust stroke of the piston 10, the lip 17 as formed by the angles "A" and "B" primarily acts as a metering device, and also serves as a positive seal if there is an appreciable pressure differential across the piston, with the pressure in the pumping fluid 15 being greater than the pressure in the pumped fluid 16.

Under these conditions, the lip 17 swings about a pivot "P" which is below the horizontal through the edge 19 and between the edge 19 and the juncture of the seal 12 and the piston 10 so that the edge 19 engages the cylinder wall 11 to seal tightly thereagainst. This action is similar to that of a cantilever.

If the pressure in the pumped fluid 16 is greater than that in the pumping fluid 15, the seal lips 18 pivot upwardly in the same fashion to seal against the cylinder wall 11.

The sealing and wiping lips 18 have an elongated outwardly tapered top surface 23 and a steeply angled bottom surface 24 which intersect in the outer peripheral line edges 19. The surfaces 23 and 24 and the cylinder inner wall 11 define the annular lubricant grooves 20.

The lubricant 15 which is trapped in the grooves 20 is compressed therein, when the piston 10 moves in the direction of arrow "X" (that is, when the pumped fluid 16 is being moved out of the cylinder 11 on the exhaust stroke of the piston 10). The lubricant 15 and the sealing lips 18 both are under the same pressure and act as seals under these operating conditions. The outermost edges 19 of the lips 18 wipe the cylinder walls 11 free from abrasive material and prevent mixing of the pumped fluid 16 and the pumping fluid 15.

When pumped fluid 16 is being pulled into the cylinder 11 on the intake stroke of the piston 10 as shown by the arrow "Y," the sealing lips 18 favor the passing of minute quantities of lubricant 15 past the lips 18 toward the pumped fluid side of the piston 10, thereby preventing mixing of the pumped fluid 16 and the pumping fluid 15. Oil passing the seal lips 18 also refills the grooves 20.

In the preferred construction, the upper surfaces 23 of the seal lips 18 define an angle of about 70° with the horizontal (angle "C" of FIG. 1) and the under surfaces 24 are approximately horizontal. The seal lip upper surfaces 23 and the adjacent bottom surfaces 24 define an angle no greater than about 70° therebetween. The more nearly the lower surfaces 24 approach the upper surfaces 23, the more readily the oil is passed past the lips 18 on the upward stroke of the piston 10. Similarly the more nearly the upper surface 23 approaches the vertical, the stronger the wiping action which is evidenced by the lips 18 on the exhaust stroke of the piston 10. The upper surface 23 is about three times as long as the under surface 24.

The abrasive material in the pumped fluid 16 is wiped from the cylinder wall 11 by the outer peripheral edge 19a of the leading seal lip 18a which is of slightly greater diameter (approximately 0.02 inch) than the nearest backup seal lip 18. Also, the under surface 24a of the leading seal lip 18a is inclined away from the pumped fluid 16 to more positively move abrasive particles away from the sealing edge 19a during the exhaust stroke of the piston.

Any abrasive material which passes the leading seal lip 18a is not pressed against the cylinder wall 11, but is carried into the outermost seal groove 20, where it is held by the lubricant trapped therein.

It is not desirable to wipe the cylinder wall 11 completely free of lubricant, since a molecular film of lubricant is necessary to avoid undue heat and wear on the seal.

Sealing lip 25 is a static seal bearing against retainer 14 with finite pressure so as to prevent by-passing of fluids around seal 13.

The present invention is intended to include all changes and modifications of the examples of the invention herein chosen for purposes of disclosure, which do not constitute departures from the spirit and scope of the invention.

What is claimed is:

1. A free piston seal comprising a series of spaced annular lips having peripheral essentially sharp pointed edges and defining spaced annular grooves therebetween, one of said lips being an oil control lip having oppositely inclined surfaces which intersect to define the peripheral edge, said oil control lip adapted to meter lubricating fluid from behind the piston to said annular grooves during the intake stroke of the piston, and a plurality of seal lips spaced outwardly from said oil control lip, each of said seal lips having upper and bottom surfaces which intersect at the peripheral edges, said surfaces being angled so as to pass minute quantities of lubricating fluid by the outer peripheral edges of said lips during the intake stroke of the piston and to preclude the passing of the pumped fluid during the exhaust stroke of the piston, the seal lip nearest to the pumped fluid having a greater diameter than the other seal lips.

2. A seal for a free piston confined in a cylinder and separating two dissimilar fluids, one of which is of a lubricating nature and is the pumping fluid and the other of which is of an abrasive nature and is the pumped fluid, comprising an oil control lip adjacent to the pumping fluid side of said seal, said oil control lip having an outwardly inclined upper surface and an inwardly inclined bottom surface intersecting in an outer peripheral edge, said lip metering the passage of oil around the edge thereof during the intake stroke of said piston, and a plurality of seal lips spaced from said oil control lip in the direction of the pumped fluids, said seal lips having outwardly inclined upper surfaces which intersect adjacent bottom surfaces to define outer peripheral line edges of said lips, said seal lips defining annular grooves therebetween from which oil trapped therein is more readily passed toward the pumped fluid during the intake stroke of the piston, said seal lips being of progressively greater diameter approaching the pumped fluid side of said seal to provide a series of seals wherein each succeeding lip assumes the next preceding lip's function if the latter lip becomes ineffective.

3. A seal for a free piston confined in a cylinder and separating two dissimilar fluids, one of which is of a lubricating nature and is the pumping fluid and the other of which is of an abrasive nature and is the pumped fluid, comprising an oil control lip adjacent to the pumping fluid side of said seal, said oil control lip having an outwardly inclined upper surface and an inwardly inclined bottom surface intersecting in an outer peripheral edge, said lip metering the passage of oil around the edge thereof during the intake stroke of said piston, and a plurality of seal lips spaced from said oil control lip in the direction of the pumped fluids, said seal lips having outwardly inclined upper surfaces which intersect adjacent bottom surfaces to define outer peripheral line edges of said lips, said seal lips defining annular grooves therebetween from which oil trapped therein is more readily passed toward the pumped fluid during the intake stroke of the piston, the upper surfaces of the seal lips defining an angle of approximately 70° with the horizontal and the angle between said upper surfaces and the adjacent bottom surfaces is also approximately 70°, the seal lip adjacent to the pumped fluid being of slightly greater diameter than the other seal lips and the under surface thereof inclined away from the pumped fluid to offer more resistance to the flow of lubricating fluid past said lip toward the pumped fluid than the other seal lips and to favor flow of lubricating fluid past said lip on the intake stroke of the piston while wiping the abrasive pumped fluid from the cylinder wall and preventing its passing the seal on the exhaust stroke of the piston.

4. A rubberlike seal for a single acting free piston type pump wherein said piston is merely confined in a cylinder without other attachment and is therefore in effect only serving to separate two dissimilar fluids, the pressure in each fluid being nearly identical at all times regardless of the pumping pressure or the phase of the pumping cycle, one of the fluids being of a lubricating nature and is the pumping fluid and the other of which is of an abrasive or erosive nature and is the pumped fluid, said seal comprising a plurality of lips inclined toward the pumped fluid, said lips being sharp edged with the spaces between them being annular grooves from which lubricating fluid trapped therein is favored, by reason of the lip inclination, to pass in minute quantities toward the pumped fluid during the intake stroke while the passage of the pumped fluid toward the pumping fluid is substantially precluded regardless of the pumping phase, the cylinder walls being lightly coated with the lubricating fluid at all times and passage of pumped fluid into the pumping fluid space being minimized, said seal lips being of progressively greater diameter approaching the pumped fluid side of said seal to insure the annular grooves between lips being filled with lubricating fluid and to provide a series of seals wherein each succeeding lip assumes the next preceding lip's function if the latter becomes ineffective.

5. A rubberlike seal for a single acting free piston type pump wherein said piston is merely confined in a cylinder without other attachment and is therefore in effect only serving to separate two dissimilar fluids, the pressure in each fluid being nearly identical at all times regardless of the pumping pressure or the phase of the pumping cycle, one of the fluids being of a lubricating nature and is the pumping fluid and the other of which is of an abrasive or erosive nature and is the pumped fluid, said seal comprising a plurality of lips inclined toward the pumped fluid, said lips being sharp edged with the spaces between them being annular grooves from which lubricating fluid trapped therein is favored, by reason of the lip inclination, to pass in minute quantities toward the pump fluid during the intake stroke while the passage of the pumped fluid toward the pumping fluid is substantially precluded regardless of the pumping phase, the cylinder walls being lightly coated with the lubricating fluid at all times and passage of pumped fluid into the pumping fluid space being minimized, the lubricating fluid trapped in the annular grooves, in conjunction with the unyielding cylinder boundaries, supporting and confining the rubberlike seal material so that it will not appreciably change shape or increase the total pressure which it exerts against the cylinder wall during any phase of the pumping cycle, the contact area between seal lips and cylinder wall being negligible since the contact is line contact, regardless of the pumping pressure, so long as the piston remains a free piston, therefore insuring minimal wear of the cylinder liner and seal.

References Cited in the file of this patent

UNITED STATES PATENTS

| | | |
|---|---|---|
| 2,246,577 | Davis | June 24, 1941 |
| 2,417,349 | Colbaugh | Mar. 11, 1947 |
| 2,686,092 | Neesen | Aug. 10, 1954 |
| 3,036,874 | Sharp | May 29, 1962 |
| 3,052,196 | Gilmore | Sept. 4, 1962 |